United States Patent
Wied et al.

(10) Patent No.: US 9,083,702 B2
(45) Date of Patent: Jul. 14, 2015

(54) SYSTEM AND METHOD FOR PROVIDING INTERNAL SERVICES TO EXTERNAL ENTERPRISES

(71) Applicant: Bank of America Corporation, Charlotte, NC (US)

(72) Inventors: William J. Wied, Austin, TX (US); Matthew L. Donlan, Charlotte, NC (US); Jason D. Parrish, Jacksonville, FL (US); Joseph B. Castinado, Northglenn, CO (US); Jason R. Bradshaw, Neptune Beach, FL (US); Christopher T. Hart, Pineville, NC (US)

(73) Assignee: Bank of America Corporation, Charlotte, NC (US)

( * ) Notice: Subject to any disclaimer, the term of this patent is extended or adjusted under 35 U.S.C. 154(b) by 122 days.

(21) Appl. No.: 13/920,511

(22) Filed: Jun. 18, 2013

(65) Prior Publication Data

US 2014/0373121 A1 Dec. 18, 2014

(51) Int. Cl.
 H04L 29/06 (2006.01)
 H04L 9/32 (2006.01)
 G06F 21/33 (2013.01)

(52) U.S. Cl.
 CPC .......... *H04L 63/0846* (2013.01); *G06F 21/335* (2013.01); *H04L 9/3228* (2013.01); *H04L 63/0815* (2013.01); *H04L 63/0823* (2013.01)

(58) Field of Classification Search
 None
 See application file for complete search history.

(56) References Cited

U.S. PATENT DOCUMENTS

| | | | |
|---|---|---|---|
| 8,327,131 B1* | 12/2012 | Hardjono et al. | 713/156 |
| 2008/0016195 A1* | 1/2008 | Tulshibagwale et al. | 709/223 |
| 2008/0021866 A1* | 1/2008 | Hinton et al. | 707/2 |
| 2012/0016795 A1* | 1/2012 | Hill et al. | 705/39 |
| 2012/0117634 A1* | 5/2012 | Halls et al. | 726/7 |

OTHER PUBLICATIONS

U.S. Appl. No. 13/563,210 entitled "Communication Network for Gathering Information and Performing Electronic Transactions," filed Jul. 31, 2012.

* cited by examiner

*Primary Examiner* — Michael R Vaughan
(74) *Attorney, Agent, or Firm* — Michael A. Springs

(57) ABSTRACT

In certain embodiments, a system for providing internal services to third party enterprises comprises a memory module operable to store credentials associated with each of a plurality of third party enterprises, an interface module operable to receive a service request associated with a particular third party enterprise, the service request including a token associated with the particular third party enterprise, and a processing module operable to validate the particular third party enterprise, determine a particular internal service offered by an enterprise that is the subject of the service request, the interface module further operable to forward the service request to the particular internal service, receive results corresponding to the service request generated by the particular internal service, and communicate the results corresponding to the service request to the particular third party enterprise, and the memory module further operable to store the results corresponding to the service request.

17 Claims, 12 Drawing Sheets

SYSTEM AND METHOD FOR PROVIDING INTERNAL SERVICES TO EXTERNAL ENTERPRISES

TECHNICAL FIELD

This disclosure relates generally to computer system services, and more particularly to a system and method for securely providing internal computer system services to external enterprises.

BACKGROUND

Enterprises often maintain internal computer systems that provide services for the enterprise. The systems are available within the enterprise, but not available externally. Typically, these systems require significant resources to design, develop, and maintain. For example, an enterprise may invest the resources to develop a system to provide a particular service that is too costly or impractical for other third party enterprises to develop (e.g., because expected service use does not justify investment cost).

SUMMARY OF EXAMPLE EMBODIMENTS

According to embodiments of the present disclosure, disadvantages and problems associated with providing internal services to external enterprises may be reduced or eliminated.

In certain embodiments, a system includes one or more memory modules operable to store credentials associated with each of a plurality of previously-authenticated third party enterprises, one or more interface modules communicatively coupled to the one or more memory modules, the one or more interface modules operable to receive a service request associated with a particular third party enterprise of the plurality of previously-authenticated third party enterprises, the service request including a token associated with the particular third party enterprise, and one or more processing modules communicatively coupled to the one or more memory modules and the one or more interface modules, the one or more processing modules operable to validate the particular third party enterprise based on a comparison of the token associated with the particular third party enterprise and the credentials associated with the particular third party enterprise, and determine, based on one or more attributes of the service request, a particular internal service among a plurality of internal services offered by an enterprise that is the subject of the service request. The one or more interface modules are further operable to forward the service request to the particular internal service, receive results corresponding to the service request generated by the particular internal service, and communicate the results corresponding to the service request to the particular third party enterprise. The one or more memory modules are further operable to store returned the results corresponding to the service request.

Certain embodiments of the present disclosure may provide one or more technical advantages having specific technical effects.

In certain embodiments, an enterprise provides internal computer system services to external, third party enterprises, thereby conserving the computational resources consumed by multiple enterprises developing redundant computer systems.

In another embodiment, an enterprise provides internal computer system services to external, third party enterprises through a secure gateway, thereby conserving the computational resources expended to recover from attacks from malicious entities.

In yet another embodiment, an enterprise provides internal computer system services to external, third party enterprises, thereby conserving the computational resources and bandwidth consumed by multiple enterprises maintaining redundant databases.

In yet another embodiment, an enterprise provides internal computer system services to external, third party enterprises by utilizing content-based routing to provide the external, third party enterprise access to the requested internal service application, thereby conserving the computational resources and bandwidth consumed by intermediate applications passing information between the external, third party enterprise and the service application.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1 through 12 of the drawings, like numerals being used for like and corresponding parts of the various drawings.

In certain embodiments, an enterprise develops internal computer systems to provide services (e.g., service applications) to the enterprise. An enterprise may invest resources to develop these computer systems that are too costly or impractical for other enterprises to develop. In an embodiment, an enterprise has relationships within a market that provide the enterprise with access to information that is not available to all enterprises in the market, and the enterprise can develop service applications that utilize this information. It may be advantageous for an enterprise with computer systems that provide valuable service applications to allow other, external, third party enterprises to access the service applications.

In an embodiment, an enterprise provides access to internal service applications to external, third party enterprises through a services gateway. External, third party enterprises may send service requests to the services gateway. In certain embodiments, service requests from third party enterprises contain an authentication token indicating that the requesting third party enterprise has been previously authenticated (e.g., by an authentication gateway). The services gateway may verify the authorization of the service requests with a gateway utility service application and then, if the request is authorized, determine one or more appropriate service applications, and communicate the request to the determined service applications. In an embodiment, service applications respond to service requests and services gateway communicates the service responses to the requesting third party enterprise.

Third party enterprises may obtain authentication tokens through an authentication gateway. In certain embodiments, the authentication gateway receives authentication requests from third party enterprises requesting authentication tokens. The authentication requests may contain credentials for the third party enterprise verifying their identity. In an embodiment, authentication gateway receives authentication requests and coordinates with a gateway utility service application to verify the credentials of the third party enterprise in the authentication request. If the credentials are verified, authentication gateway may coordinate with a token service to generate an authentication token for the requesting third party enterprise and communicate the authentication token to the requesting third party enterprise. In certain embodiments, the gateway utility service application stores the third party enterprise credentials in a gateway database that is architecturally distinct from the authentication gateway, such that access to the authentication gateway does not provide access to the gateway database of third party enterprise credentials.

Figure 1:
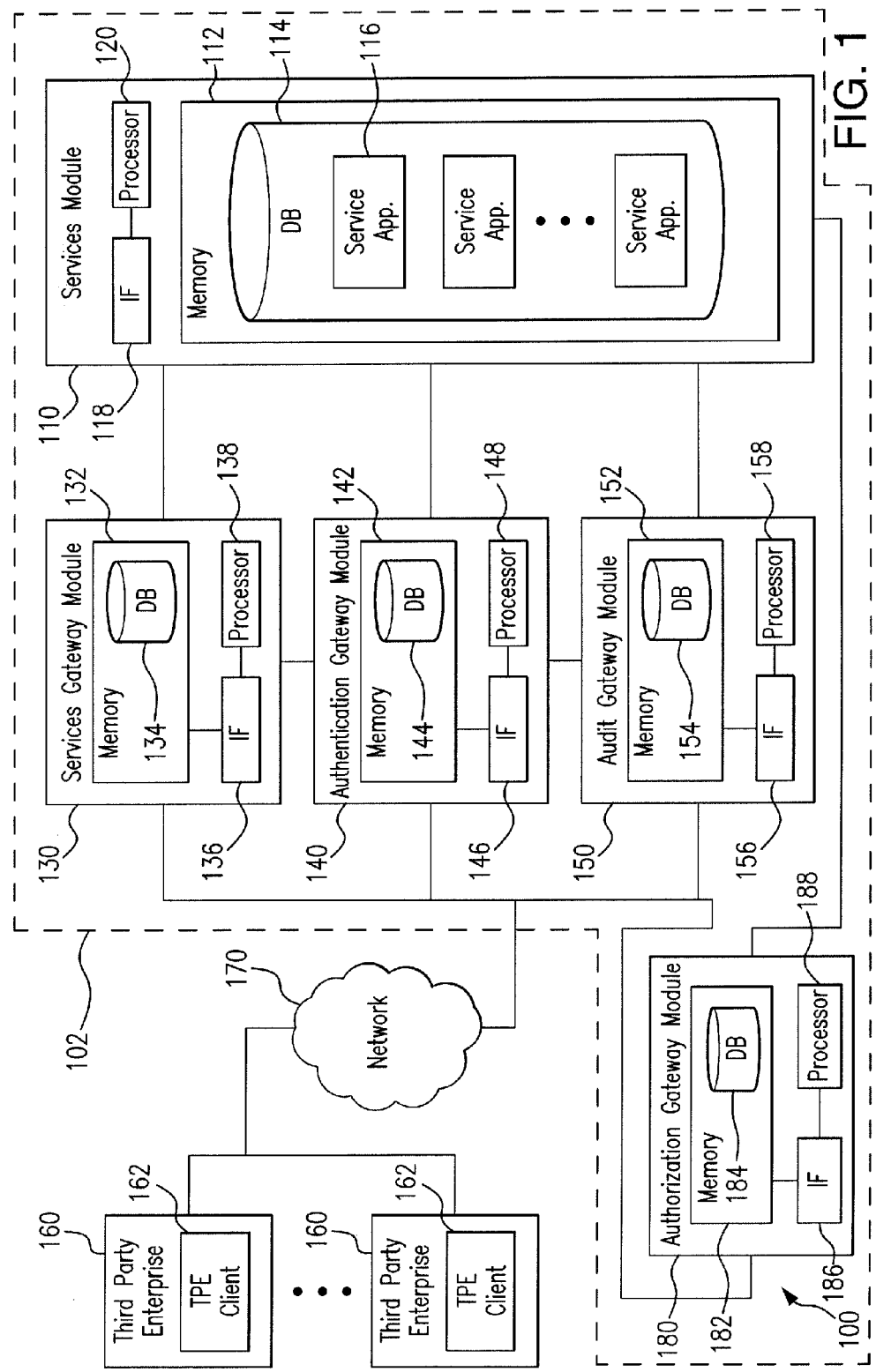
FIG. 1 illustrates an example system for securely providing internal services to external enterprises, according to certain embodiments of the present disclosure.

FIG. 1 illustrates an example system 100 for securely providing internal services to external enterprises, according to certain embodiments of the present disclosure. According to an embodiment, system 100 includes enterprise 102, services module 110, services gateway module 130, authentication gateway module 140, audit module 150, authorization gateway module 180, third party enterprises 160, and network 170.

Enterprise 102 represents an entity that maintains and/or operates services module 110, services gateway module 130, authentication gateway module 140, authorization gateway module 180, and/or audit module 150. Enterprise 102 may be any suitable type of business entity. In certain embodiments, enterprise 102 has different business units or subdivisions that handle different business activities. Different subdivisions of enterprise 102 may maintain and/or operate one or more of services module 110, services gateway module 130, authentication gateway module 140, authorization gateway module 180, and/or audit module 150. In particular embodiments, enterprises 102 may include organizations such as commercial banks, savings and loan associations, credit unions, Internet banks, mutual fund companies, brokerage firms, credit card companies, or other provider of electronic transaction services.

Services module 110 represents a computer system operable to provide one or more service applications 116 to enterprise 102 and/or third party enterprises 160. In certain embodiments, services module 110 includes memory 112, database 114, service applications 116, interface 118, and processor 120. Services module 110 may be communicatively coupled to one or more of services gateway module 130, authentication gateway module 140, audit module 150, third party enterprises 160, and network 170.

Service applications 116 represent one or more applications maintained and/or operated by enterprise 102 that are operable to provide particular services to enterprise 102 and/or third party enterprises 160. Enterprise 102 may maintain a plurality of service applications 116 that can be provided to external, third party enterprises 160. Service applications 116 may include any suitable service application 116 maintained by enterprise 102.

In certain embodiments, service applications 116 include a fund transfer service application operable to calculate the cost (e.g., fees and/or taxes) and or time associated with a fund transfer (e.g., domestic and/or international wire transfers). The fund transfer service application may be operable to determine the cheapest and/or fastest routes for a fund transfer. In an embodiment, the fund transfer service application identifies patterns in fund transfers for a particular transferor. Fund transfer service application may communicate alternate fund transfer options (e.g., alternate timing, alternate amounts, alternate destinations, alternate transfer routes, etc.) to the transferor based on the identified patterns.

In another embodiment, service applications 116 include a fund monitoring service application operable to monitor fund movement for a particular entity. An entity may be an individual, business, account, or other entity associated with third party enterprises 160 and/or enterprise 102 (e.g., a customer or client of the third party enterprises 160 and/or enterprise 102). The fund monitoring service application may be operable to place restrictions on a particular entity (e.g., limit the services available to the entity) based on activities such as service usage history. The fund monitoring service application may further be operable to analyze the fund transfer patterns of an entity (e.g., timing, amount, source, destination, etc.) and determine suggestions based on the patterns that may be communicated to the entity. In an embodiment, the fund monitoring service application identifies alternate timing for one or more fund transfers (e.g., transferring funds earlier to save transfer costs). In another embodiment, the fund monitoring service application identifies alternate fund transfers (e.g., from a savings account to an investment account) for one or more fund transfers.

In certain embodiments, service applications 116 include an account overview service application operable to provide a centralized overview of related accounts (e.g., associated with an individual, business, or account). For example, an entity may have accounts over a number of platforms (e.g., mortgage accounts, student loan accounts, retirement accounts, checking accounts, savings accounts, etc.) and may have a number of fund transfers associated with these accounts. In an embodiment, account overview service application is operable to receive access information from an entity for particular accounts, access the accounts, pull information from the accounts, and populate the information in a centralized platform accessible by the entity.

Service gateway module 130 represents a computer system operable to provide secure access to service applications 116 of services module 110 to third party enterprises 160. In certain embodiments, service gateway module 130 includes memory 132, database 134, interface 136, and processor 138. Services gateway module 130 may be communicatively coupled to one or more of services module 110, authentication gateway module 140, authorization gateway module 180, audit module 150, third party enterprises 160, and network 170. In an embodiment, service gateway module 130 authorizes third party enterprises before granting access to service applications 116. For example, service requests from third party enterprises may contain an authentication token within the request. In certain embodiments, service gateway module 130 validates the token by comparing the token received in the request from the third party enterprise 160 to stored credentials associated with the third party enterprise 160. If the information in the token is consistent with the information in the credentials, the third party enterprise 160 is authorized to access service applications 116.

In particular embodiments, after validating third party enterprises 160 as authorized to access service applications 116, service gateway module 130 determines one or more responsive service applications 116 that are responsive to the service request and routes the service request to the determined service applications 116. Service requests may include a plurality of information about the source of the service request, the destination of the service request, the services requested, or any other suitable information. For example, a service request may contain attributes such as the username of the requesting third party enterprise 160, the data size of the service request, an identification of operations requested by the service request, or any other suitable information. In an embodiment, service gateway module 130 determines one or more responsive service applications 116 based on one or more attributes of the service request (e.g., requesting username, request data size, and requested operation). In an embodiment, service gateway module 130 routes the service request to the determined one or more service applications 116. Service gateway module 130 may receive responses containing results corresponding to the service requests from the determined one or more service applications 116 and may communicate the results to the requesting third party enterprise 160.

Authentication gateway module 140 represents a computer system operable to authenticate third party enterprises 160 before providing third party enterprises 160 access to service applications 116. In certain embodiments, authentication gateway module 140 includes memory 142, database 144, interface 146, and processor 148. Authentication gateway module 140 may be communicatively coupled to one or more of services module 110, services gateway module 130, authorization gateway module 180, audit module 150, third party enterprises 160, and network 170. Authentication gateway module 140 may receive authentication requests from third party enterprises 160. In an embodiment, authentication requests contain credentials associated with the requesting third party enterprise 160 that allow authentication gateway module 140 to verify the identity of third party enterprise 160. Authentication gateway module 140 may store the credentials associated with third party enterprise 160 and generate an authentication token for third party enterprise 160. The authentication token may be included in service requests from third party enterprise 160 to allow third party enterprise 160 access to service applications 116. In certain embodiments, authentication gateway module 140 communicates the generated authentication token to third party enterprise 160 in response to successful token generation. The authentication tokens allow previously authenticated third party enterprises 160 to prove their identity in subsequent service requests to services gateway 130.

Authentication gateway module 140 may store the credentials associated with third party enterprise 160 in an architecturally distinct storage space (e.g., audit module 150) separate from authentication gateway module 140 such that access to authentication module 140 does not provide access to the stored credentials of third party enterprises 160. By separating authentication gateway module 140 from the stored credentials of third party enterprises 160, the stored credentials of third party enterprises 160 are protected in the event that an unauthorized entity gained access to authentication gateway module 140. In certain embodiments, the credentials associated with third party enterprises 160 are valid for particular time periods, for example, a particular predetermined time period after a previous authentication of third party enterprise 160. The limited amount of time the credentials are valid represents an expiration date for the credentials, after which third party enterprise 160 must re-authenticate to continue to access service applications 116.

Authorization gateway module 180 represents a computer system operable to determine whether service requests from third party enterprises 160 to access service applications 116 are authorized. In certain embodiments, authorization gateway module 180 includes memory 182, database 184, interface 186, and processor 188. Authorization gateway module 180 may be communicatively coupled to one or more of services module 110, services gateway module 130, authentication gateway module 140, audit module 150, third party enterprises 160, and network 170. In an embodiment, authorization gateway module 180 receives service requests from third party enterprises 160 and extracts credentials, which can include username and password information, from the service request. Authorization gateway module 180 may compare the credentials of third party enterprises 160 to stored credential information for third party enterprises 160 (e.g., in audit module 150). In particular embodiments, if the credentials received from third party enterprises 160 match the stored credential information, then authorization gateway module 180 determines that the service request is authorized. If the received credentials do not match the stored credential information, then authorization gateway module 180 may determine that the service request is not authorized. In certain embodiments, authorization of a service request may depend on the particular service requested. For example, a particular third party enterprise 160 may be authorized to access some service applications 116 but not others.

Audit module 150 represents a computer system operable to store information related to service requests from third party enterprises 160. In certain embodiments, audit module includes memory 152, database 154, interface 156, and processor 158. Audit module 150 may be communicatively coupled to one or more of services module 110, services gateway module 130, authentication gateway module 140, authorization gateway module 180, third party enterprises 160, and network 170. In particular embodiments, audit module 150 stores information related to service requests, requesting third party enterprises 160, service applications 116 deemed responsive to service requests, results generated by service applications 116 in response to service requests, authentication and authorization information related to particular third party enterprises 160, or any other suitable information. Audit module 150 may be architecturally distinct and separate from authentication gateway module 140 such that access to authentication gateway module 140 does not provide access to audit module 150. Audit module 150 may store sensitive information (e.g., third party enterprise 160 credential information) in an encrypted format. In an embodiment, audit module 150 is operable to filter and query information stored in audit module 150 such that the information is searchable. Audit module 150 may be operable to generate reports of information stored in audit module 150 based on received filter criteria.

Third party enterprises 160 represent entities that are external, separate, and/or distinct from enterprise 102. In certain embodiments, third party enterprises 160 do not maintain and/or operate services module 110 or service applications 116. For example, enterprise 102 may control the access of third party enterprises 160 to services module 110 and service applications 116. Third party enterprises 160 may be any suitable type of business entity. In an embodiment, third party enterprises 160 have different business units, or subdivisions that handle different business activities. Third party enterprises 160 may include organizations such as commercial banks, savings and loan associations, credit unions, Internet banks, mutual fund companies, brokerage firms, credit card companies, or other provider of electronic transaction services. In particular embodiments, third party enterprises 160 include a third party enterprise client ("TPE client") 162.

TPE client 162 represents a client application of third party enterprises 160 that enables third party enterprises 160 to access service applications 116 of enterprise 102. TPE client 162 may be computer hardware and/or software that enables access to server provided services (e.g., service applications 116). In particular embodiments, TPE client 162 communicates with components of system 100 (e.g., authentication gateway module 140, authorization gateway module 180, and service gateway module 130) to request an authentication token, to communicate the credentials of TPE client 162 to enterprise 102, to obtain authorization to access service applications 116, and to request access to service applications 116.

Network 170 represents any suitable network operable to facilitate communication between components of system 100, such as enterprise 102, services module 110, services gateway module 130, authentication gateway module 140, authorization gateway module 180, audit module 150, and third party enterprises 160. Network 170 may include any interconnecting system capable of transmitting audio, video, electrical signals, optical signals, data, messages, or any combination of the preceding. Network 170 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100 and third party enterprises 160.

A module (e.g., modules 110, 130, 140, 150, and 180) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as services module 110, service gateway module 130, authentication gateway module 140, authorization gateway module 180, and audit module 150, may include one or more processors. A processor represents any computing device, such as processors 120, 138, 148, 158, and 188, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., modules 110, 130, 140, 150, and 180), an interface (e.g., interfaces 118, 136, 146, 156, and 186), a memory (e.g., memories 112, 132, 142, 152, and 182), a database (e.g., databases 114, 134, 144, 154, and 184), or any other suitable component.

An interface represents any device, such as interfaces 118, 136, 146, 156, and 186 operable to receive input, send output, process the input or output, or perform other suitable operations for a component of system 100. An interface includes any port or connection, real or virtual, including any suitable hardware or software, including protocol conversion and data processing capabilities, to communicate through network 170. In certain embodiments, an interface includes a user interface (e.g., physical input, graphical user interface, touchscreen, buttons, switches, transducer, or any other suitable method to receive input from a user).

A memory represents any device, such as memories 112, 132, 142, 152, and 182 operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., databases 114, 134, 144, 154, and 184).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

Modifications, additions, or omissions may be made to system 100. System 100 may include more, fewer, or other components. Any suitable component of system 100 may include a processor, interface, logic, memory, or other suitable element.

Figure 2:
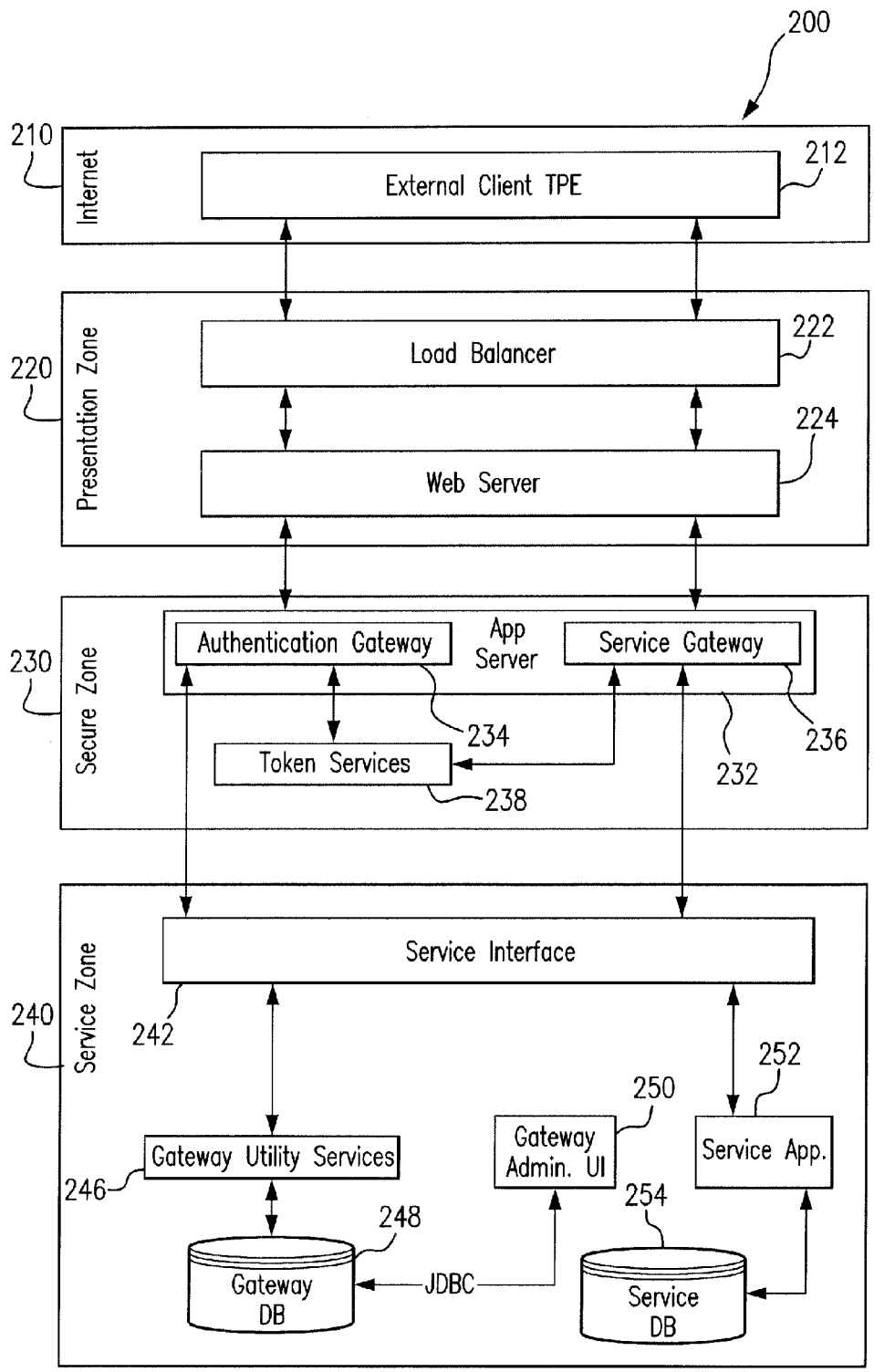
FIG. 2 illustrates a block diagram of an example system for securely providing internal services to external enterprises, according to certain embodiments of the present disclosure.

FIG. 2 illustrates a block diagram of an example system for securely providing internal services to external enterprises, according to certain embodiments of the present disclosure. According to an embodiment, system 200 includes internet zone 210, presentation zone 220, secure zone 230, and service zone 240.

Internet zone 210 represents a domain external to enterprise 102. In certain embodiments, internet zone 210 represents a public network (e.g., the Internet). Internet zone 210 may include one or more external third party enterprise clients ("TPE client") 212. TPE clients 212 represent a client application of third party enterprises 160 that enables third party enterprises 160 to access service applications 252 of enterprise 102. TPE client 212 may be computer hardware and/or software that enables access to server provided services (e.g., service applications 252). In particular embodiments, TPE client 212 communicates with components of system 200 (e.g., authentication gateway 234 and service gateway 236) to request an authentication token, to communicate the credentials of TPE client 212 to enterprise 102, to obtain authorization to access service applications 252, and to request access to service applications 252.

Presentation zone 220 represents a landing domain for authentication requests and service requests from TPE clients 212. In certain embodiments, presentation zone 220 includes load balancer 222 and web server 224. Load balancer 222 represents a component operable to distribute workload (e.g., authentication requests and service requests) evenly across processing resources (e.g., computers, servers, server networks, etc.). Load balancer 222 may be any suitable load balancer, such as those sold by F5, Barracuda Networks, and Rackspace. In particular embodiments, load balancer 222 distributes requests (e.g., authentication requests and service requests) across the computing resources of web server 224. Load balancer 222 may decrypt the secure socket layer ("SSL") of requests, read the requests, determine appropriate routing to web server 224 based on the request, re-encrypt the requests, and route the requests to web server 224. Web server 224 represents one or more network servers operable to receive requests (e.g., authentication requests and/or service requests) from load balancer 222. Web server 224 may be any suitable server, for example, web servers sold by Apache, Cisco, Microsoft, Barracuda Networks, Dell, and Intel. In particular embodiments, web server 224 decrypts the SSL of requests, and proxies the requests to application server 232 in secure zone 230.

Secure zone 230 represents a secure domain for authenticating TPE clients 212 and authorizing service requests from TPE clients 212. In certain embodiments, secure zone 230 includes application server 232 and token service 238. Application server 232 may include authentication gateway 234 and service gateway 236. Application server 232 represents an application server operable to support the functions of authentication gateway 234 and services gateway 236. Application server 232 may be any suitable application server, for example, application servers sold by IBM, Cisco, Nortel, and Avaya.

Authentication gateway 234 represents a software application running on application server 232 operable to authenticate TPE clients 212. In particular embodiments, authentication gateway 234 receives proxy authentication requests for TPE clients 212 from web server 224 and coordinates the generation of authentication tokens for TPE clients 212 from token service 238. Authentication gateway 234 may receive credentials associated with TPE client 212 through the proxy authentication request. In an embodiment, authentication gateway 234 checks the received credentials with gateway utility service 246. Authentication gateway 234 may receive a response from gateway utility service 246 notifying authentication gateway 234 whether the received TPE client 212 credentials are valid. In particular embodiments, if authentication gateway 232 receives notice that the TPE client 212 credentials are valid, authentication gateway 232 requests that token service 238 generate an authentication token for TPE client 212, and communicates the generated authentication token to TPE client 212 in response to successful token generation. The authentication tokens allow previously authenticated TPE clients 212 to prove their identity in subsequent service requests to services gateway 236.

In certain embodiments authentication gateway 234 stores the credentials associated with TPE client 212 in an architecturally distinct storage space (e.g., gateway database 248) separate from authentication gateway 234 such that access to authentication gateway 234 does not provide access to the stored credentials of TPE clients 212. By separating authentication gateway 234 from the stored credentials of third TPE clients 212, the stored credentials of TPE clients 212 are protected in the event that an unauthorized entity gained access to authentication gateway 234. In certain embodiments, the credentials associated with TPE client 212 are valid for particular time periods, for example, a particular predetermined time period after a previous authentication of TPE client 212. The limited amount of time the credentials are valid represent an expiration date for the credentials, after which TPE client 212 must re-authenticate to continue to access service applications 252.

Service gateway 236 represents a software application running on application server 232 operable to verify the authorization of service requests from TPE clients 212 and to route the requests to the appropriate service application 252 (e.g., service gateway module 130). In particular embodiments, service gateway 236 receives proxy service requests for TPE clients 212 from web server 224, verifies the authorization of the service request, determines the appropriate service application 252 to route the service request, and routes the service request to the determined service application 252. Service gateway 236 may authorize TPE clients 212 before granting access to service applications 116. For example, service requests from TPE clients 212 may contain an authentication token within the request. In certain embodiments, service gateway 236 validates the token by comparing the token received in the request from a particular TPE client 212 to stored credentials associated with the particular TPE client 212. If the information in the token (e.g., username, password, or other credentials) is consistent with the stored credentials, TPE client 212 is authorized to access service applications 252. In certain embodiments, authorization of the service request is based on the service application 252 responsive to the service request. For example, TPE client 212 may be authorized to access some service applications 252, but not others.

In particular embodiments, after validating TPE clients 212 as authorized to access service applications 252, service gateway 236 determines one or more service applications 252 that are responsive to the service request and routes the service request to the determined service applications 252. Service requests may include a plurality of information about the source of the service request, the destination of the service request, the services requested, or any other suitable information. For example, a service request may contain attributes such as the username of the requesting third party enterprise 160, the data size of the service request, an identification of operations requested by the service request, or any other suitable information. In an embodiment, service gateway 236 determines one or more responsive service applications 252 based on one or more attributes of the service request (e.g., requesting username, request data size, and requested operation). Service gateway 236 may route the service request to the determined one or more service applications 252. Service gateway 236 may receive responses containing results corresponding to the service requests from the determined one or more service applications 252 and may communicate the results to the requesting TPE client 212.

Token service 238 represents a secure token service operable to create and validate authentication tokens (e.g., security tokens). Token service 238 may be any suitable secure token service, such as those sold by Ping, Microsoft, or other suitable manufacturer. In certain embodiments, token service 238 receives token requests from authentication gateway 234 to generate tokens in response to authentication requests from TPE clients 212. Token service 238 may receive requests from service gateway 236 to verify a token received in a service request from TPE client 212.

Service zone 240 represents a domain internal to enterprise 102. In an embodiment, access to services zone 240 is controlled by authentication gateway 234 and service gateway 236. In particular embodiments, only enterprise 102 and authenticated TPE clients 212 have access to services zone 240. Service zone 240 may include service interface 242, gateway utility service 246, enterprise authorization database 248, gateway administrator user interface ("gateway administrator UI") 250, service application 252, and service database 254.

Service interface 242 represents one or more interfaces between service zone 240 and secure zone 230. In certain embodiments, service interface 242 receives requests from authentication gateway 234 to check the credentials of TPE clients 212. Service interface 242 may communicate the request to check the credentials of TPE client 212 to gateway utility service 246, and may communicate verification of TPE client 212 credentials to authentication gateway 234. In particular embodiments, service interface 242 communicates requests from service gateway 236 for access limitations for TPE clients 212 (e.g., limited access contracts to service applications 252, unpaid bills resulting in discontinued access to service applications 252, or other access limitation) to gateway database 248. Services interface 242 may communicate responses to requests for access limitations from gateway database 248 to service gateway 236.

In an embodiment, service interface 242 receives authorization requests from service gateway 236 requesting to verify the authorization of TPE client 212 to access service applications 252. Service interface 242 may communicate the request to gateway utility service 246 to verify the authorization of TPE client 212 to access service applications 252, for example, by comparing an authentication token received from TPE client 212 in a service request to credentials associated with TPE client 212. In particular embodiments, service interface 242 communicates authorization request responses from gateway utility service 246 to service gateway 236. Service interface 242 may communicate service requests from TPE clients 212 from service gateway 236 to service applications 252, and communicate service application 252 results from service applications 252 to service gateway 236.

Gateway utility service 246 represents a computer system operable to perform authentication, authorization, and auditing functions. Gateway utility service 246 may receive authentication requests from authentication gateway 232 and may store TPE client 212 credentials in gateway database 248. In an embodiment, gateway utility service 238 receives authorization requests from service gateway 236, and references gateway database 248 to obtain TPE client 212 credentials associated with an authentication token received from TPE client 212 in a service request.

Gateway database 248 represents a database for service zone 240. Gateway database 248 may store information such as TPE client 212 credentials, information related to service requests, requesting TPE clients 212, service applications 252 deemed responsive to service requests, results generated by service applications 252 in response to service requests, authentication and authorization information related to particular TPE clients 212, or any other suitable information. Gateway database 248 may be accessed by gateway utility service 246 and gateway administrator UI 250. In certain embodiments, gateway database 248 is architecturally distinct from authentication gateway 234, such that access to authentication gateway 234 does not allow access to gateway database 248. By architecturally separating authentication gateway 232 from gateway database 248, TPE client 212 credentials are protected in the event an unauthorized user accesses authentication gateway 232.

Gateway administrator UI 250 represents an interface for gateway administrators to access gateway database 248. In certain embodiments, the connection between gateway database 248 and gateway admin UI 250 supports Java database connectivity ("JDBC").

Service applications 252 represent applications maintained and/or operated by enterprise 102 that are operable to provide particular services to enterprise 102 and/or TPE clients 212. Example service applications 252 are discussed in detail above with respect to FIG. 1. Service database 254 represents one or more databases for service applications 252. Service database 254 may store any suitable information for service applications 252.

Modifications, additions, or omissions may be made to system 200. System 200 may include more, fewer, or other components. Any suitable component of system 200 may include a processor, interface, logic, memory, or other suitable element.

Figure 3:
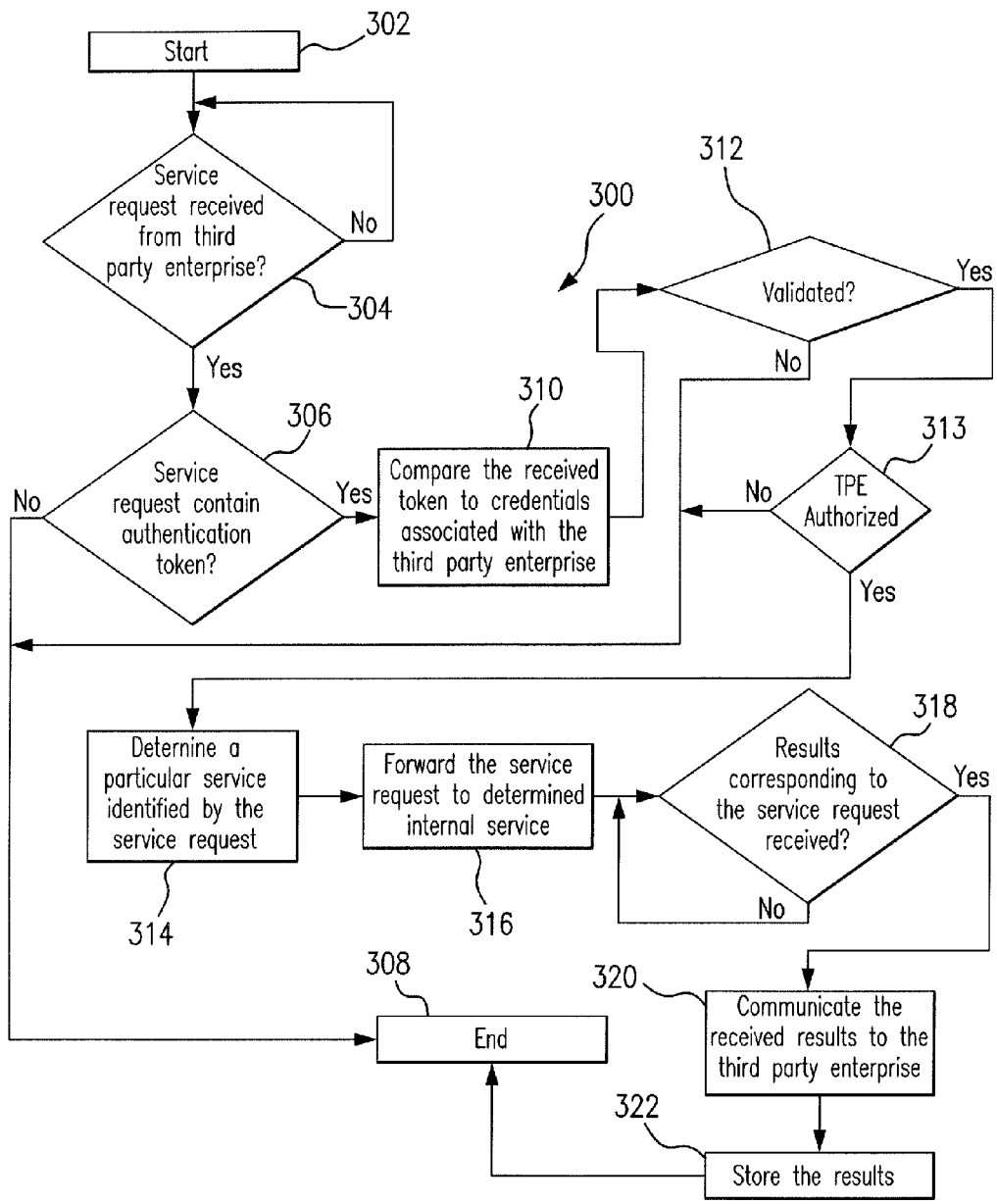
FIG. 3 illustrates an example method for securely providing internal services to external enterprises, according to certain embodiments of the present disclosure.

FIG. 3 illustrates an example method for securely providing internal services to external enterprises, according to certain embodiments of the present disclosure. Method 300 begins at step 302. At step 304, it is determined whether a service request from third party enterprise 160 has been received (e.g., at service gateways 130 and 236). If no service request has been received, the method continues to check for requests until a request is received. If a service request has been received from third party enterprise 160, the method continues to step 306. At step 306, it is determined whether the received service request contains an authentication token. If the request does not contain an authentication token, the method ends at step 308. If the request contains an authentication token, the method continues to step 310. At step 310, the received token is compared to authentication credentials associated with the third party enterprise 160 that originated the request. At step 312, it is determined whether the token is valid. If the token is not valid, the method ends at step 308. If the token is valid, the method continues to step 313. At step 313, it is determined whether the third party enterprise 160 is authorized to access service applications. If third party enterprise 160 is not authorized to access service applications, the method ends at step 308. If third party enterprise 160 is authorized to access service applications, the method continues to step 314.

At step 314, a service application for the service request is identified (e.g., based on information in the service request). At step 316, the service request is forwarded to the identified service application. At step 318, it is determined whether results from the service application related to the service request have been received. If no results have been received, the method continues to check for results until they are received. If results are received, the method continues to step 320 and the received results are communicated to the requesting third party enterprise 160. At step 322, the results that were communicated to the requesting third party enterprise 160 are also stored (e.g., in auditing module 150) and the method ends at step 308.

Modifications, additions, or omissions may be made to method 300. The method may include more, fewer, or other steps. Additionally, steps may be performed in any suitable order, in parallel, and/or sequentially. Any suitable component of may perform one or more steps of method 300.

FIGS. 4-12 illustrate flow diagrams of example flows between an external enterprise and an internal service application, according to certain embodiments of the present disclosure. Flows 400, 500, 600, 700, 800, 900, 1000, 1100 and 1200 include TPE client 212, authentication gateway 234, services gateway 236, token service 238, gateway utility service 246, service application 252, and gateway database 248, which are describe in greater detail above with respect to FIG. 2.

Figure 4:
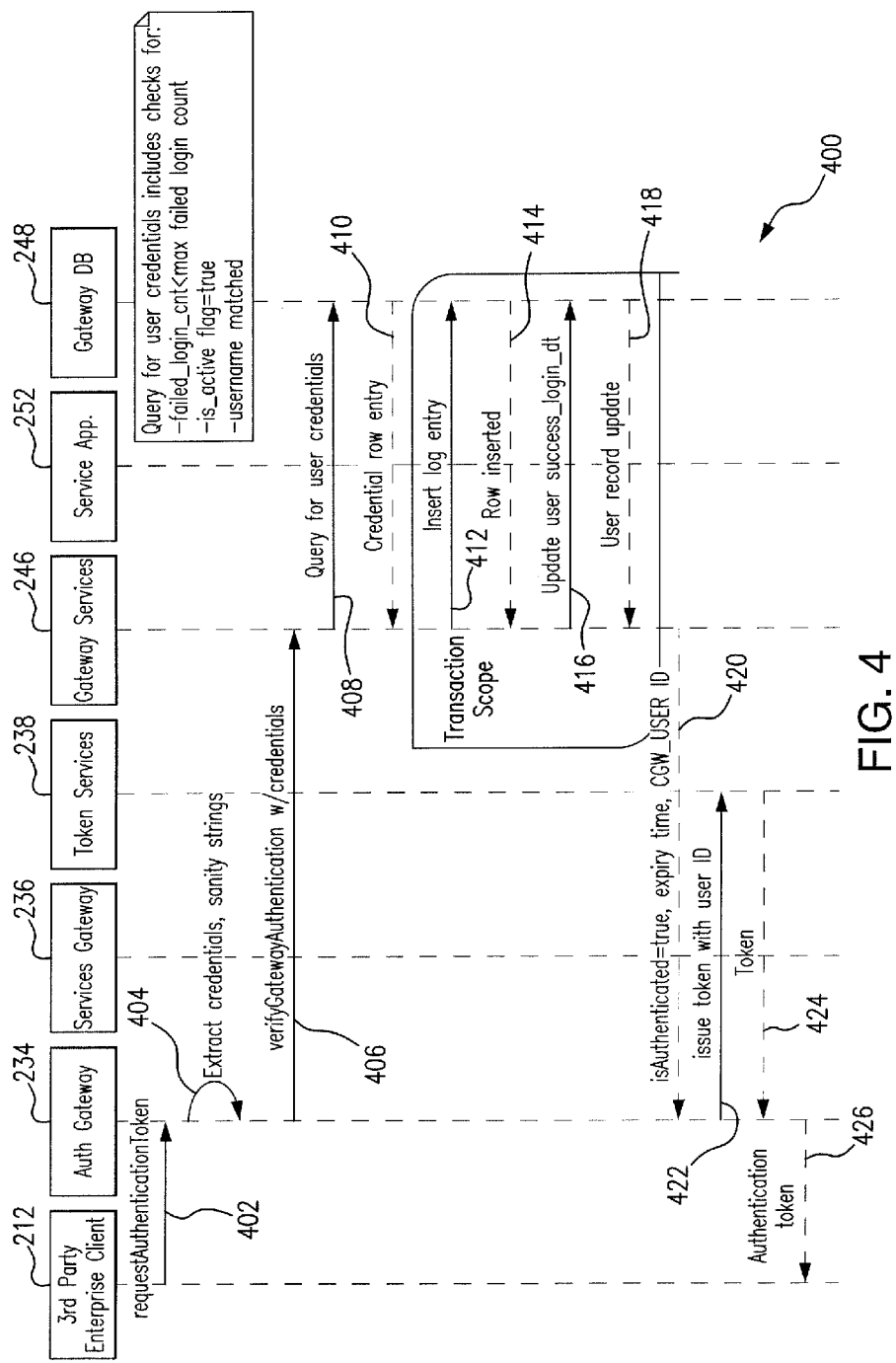
FIGS. 4-12 illustrate flow diagrams of example authentication flows between an external enterprise and an internal service application, according to certain embodiments of the present disclosure.

FIG. 4 illustrates a flow diagram of an example of a successful request for an authentication token by TPE client 212.

Flow 400 begins at step 402 when TPE client 212 communicates a request for an authentication token to authentication gateway 234. At step 404, authentication gateway 234 extracts the credentials of TPE client 212 from the request for an authentication token. Authentication gateway 234 may also verify that the authentication request contains necessary information. For example, authentication gateway 234 may verify that a username and password included in the request for authentication are a sufficient length and/or complexity, that the request for authentication does not contain malicious content, or that any other necessary information is contained in the request for authentication. At step 406, authentication gateway 234 communicates the credentials of TPE client 212 to gateway utility service 246 to authenticate TPE client 212. In certain embodiments, authentication gateway 234 encrypts the username and password (e.g., SSL) before communicating them to gateway utility services 246.

At step 408, gateway utility service 246 queries gateway database 248 for a credential row entry for TPE client 212. For example, gateway utility services 246 may take a hash of the username and/or password and query gateway database 248 for a matching hash. In certain embodiments, gateway database 248 does not maintain TPE client 212 credentials in an unencrypted format. At step 410, gateway database 248 searches for a credential row entry for TPE client 212 and returns a credential row entry from gateway database 248 for the credentials of TPE client 212. At step 412, gateway utility service 246 inserts the credentials of TPE client 212 in gateway database 248. At step 414, gateway database 248 confirms that the row entry with the credentials for TPE client 212 was inserted in gateway database 248.

At step 416, gateway utility service 246 instructs gateway database 248 to record that TPE client 212 was successfully authenticated. At step 418, gateway database 248 notifies gateway utility service 246 that the record for TPE client 212 was updated. In certain embodiments, if both steps 414 and 418 are not successful, the request for authentication fails. At step 420, gateway utility service 246 notifies authentication gateway 234 that TPE client 212 is authenticated. In certain embodiments, the notification from gateway utility service 246 includes an expiration time for the authentication token for TPE client 212. At step 422, authentication gateway 234 requests that token service 238 generate an authentication token for TPE client 212. At step 424, token service 238 communicates the authentication token for TPE client 212 to authentication gateway 234. At step 426, authentication gateway 234 communicates the authentication token for TPE client 212 to TPE client 212.

Figure 5:
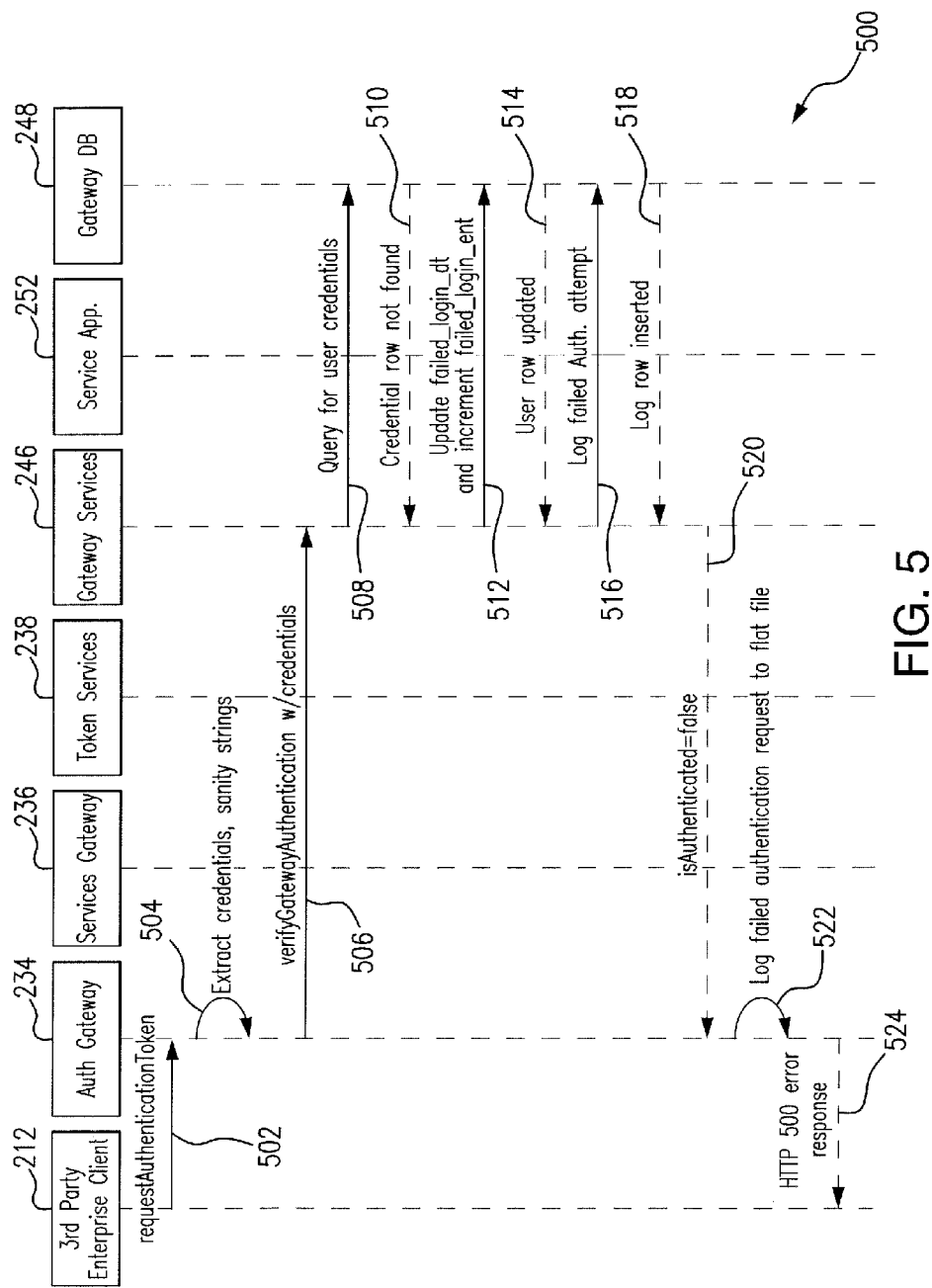

FIG. 5 illustrates a flow diagram of an example of a failed request for an authentication token by TPE client 212 resulting from gateway database 248 not finding the authentication credentials for TPE client 212. Flow 500 begins at step 502 when TPE client 212 communicates a request for an authentication token to authentication gateway 234. At step 504, authentication gateway 234 extracts the credentials of TPE client 212 from the request for an authentication token. Authentication gateway 234 may also verify that the authentication request contains necessary information. For example, authentication gateway 234 may verify that a username and password included in the request for authentication are a sufficient length and/or complexity, that the request for authentication does not contain malicious content, or that any other necessary information is contained in the request for authentication. At step 506, authentication gateway 234 communicates the credentials of TPE client 212 to gateway utility service 246 to authenticate TPE client 212. In certain embodiments, authentication gateway 234 encrypts the username and password (e.g., SSL) before communicating them to gateway utility services 246.

At step 508, gateway utility service 246 queries gateway database 248 for a credential row entry for TPE client 212. For example, gateway utility services 246 may take a hash of the username and/or password and query gateway database 248 for a matching hash. In certain embodiments, gateway database 248 does not maintain TPE client 212 credentials in an unencrypted format. At step 510, gateway database 248 searches for a credential row entry for TPE client 212 and notifies gateway utility service 246 that no row was found for the TPE client 212. At step 512, gateway utility service 246 instructs gateway database 248 to record that the request for an authentication token by TPE client 212 failed. At step 514, gateway database 248 notifies gateway utility service 246 that the row for TPE client 212 has been updated to reflect the failed authentication token request. At step 516, gateway utility service 246 communicates to gateway database 248 to log the failed authentication token request by TPE client 212. At step 518, gateway database 248 notifies gateway utility service 246 that the failed authentication token request has been recorded in gateway database 248. In certain embodiments, there is a maximum number of failed authentication token requests. If gateway database 248 determines that the maximum number of failed authentication token requests has been reached, access privileges of TPE client 212 may be limited (e.g., by denying requests from TPE client 212 to get authentication tokens and/or to access service applications).

At step 520, gateway utility service 246 notifies authentication gateway 234 that the credentials of TPE client 212 were not verified. At step 522, authentication gateway 234 records that the authentication token request of TPE client 212 failed. At step 524, authentication gateway 234 generates an error response (e.g., HTTP 500 error response) and communicates it to TPE client 212.

Figure 6:
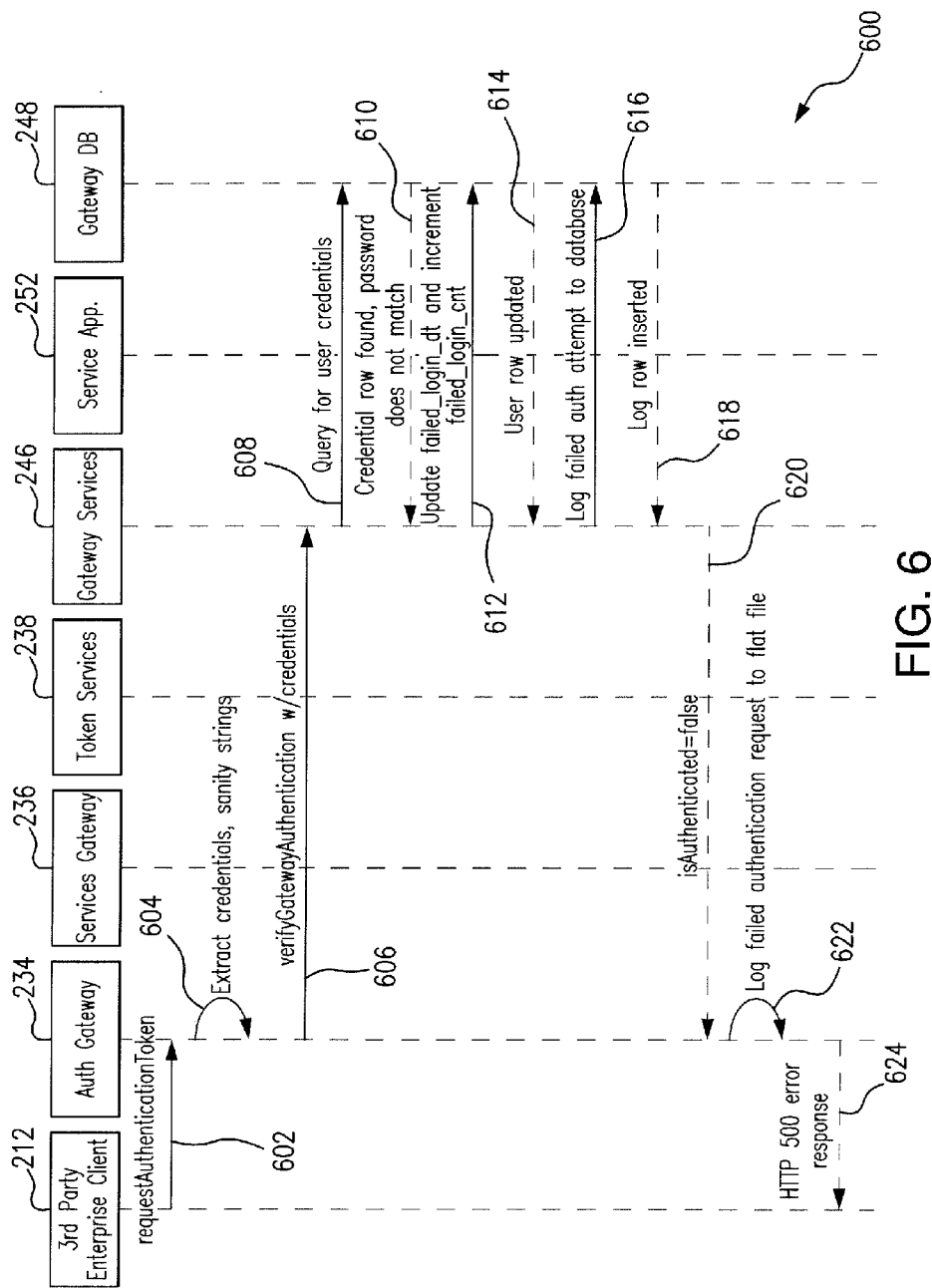

FIG. 6 illustrates a flow diagram of an example of a failed request for an authentication token by TPE client 212 resulting from gateway utility service 246 determining that the password submitted from TPE client 212 did not match the password associated with the credentials stored in gateway database 248. Flow 600 begins at step 602 when TPE client 212 communicates a request for an authentication token to authentication gateway 234. At step 604, authentication gateway 234 extracts the credentials of TPE client 212 from the request for an authentication token. Authentication gateway 234 may also verify that the authentication request contains necessary information. For example, authentication gateway 234 may verify that a username and password included in the request for authentication are a sufficient length and/or complexity, that the request for authentication does not contain malicious content, or that any other necessary information is contained in the request for authentication. At step 606, authentication gateway 234 communicates the credentials of TPE client 212 to gateway utility service 246 to authenticate TPE client 212. In certain embodiments, authentication gateway 234 encrypts the username and password (e.g., SSL) before communicating them to gateway utility services 246.

At step 608, gateway utility service 246 queries gateway database 248 for a credential row for TPE client 212. For example, gateway utility services 246 may take a hash of the username and/or password and query gateway database 248 for a matching hash. In certain embodiments, gateway database 248 does not maintain TPE client 212 credentials in an unencrypted format. At step 610, gateway database 248 searches for a credential row entry for TPE client 212 and notifies gateway utility service 246 that the credentials row in gateway database 248 for TPE client 212 exists, but the password included in the request for an authentication token is incorrect. At step 612, gateway utility service 246 instructs gateway database 248 to record that the request for an authentication token by TPE client 212 failed. At step 614, gateway database 248 notifies gateway utility service 246 that the row for TPE client 212 has been updated to reflect the failed authentication token request. At step 616, gateway utility service 246 communicates to gateway database 248 to log the failed authentication token request by TPE client 212. At step 618, gateway database 248 notifies gateway utility service 246 that the failed authentication token request has been recorded in gateway database 248. In certain embodiments, there is a maximum number of failed authentication token requests. If gateway database 248 determines that the maximum number of failed authentication token requests has been reached, access privileges of TPE client 212 may be limited (e.g., by denying requests from TPE client 212 to get authentication tokens and/or to access service applications).

At step 620, gateway utility service 246 notifies authentication gateway 234 that the password included in the request for an authentication token from TPE client 212 was not incorrect. At step 622, authentication gateway 234 records that the authentication token request of TPE client 212 failed. At step 624, authentication gateway 234 generates an error response (e.g., HTTP 500 error response) and communicates it to TPE client 212.

Figure 7:
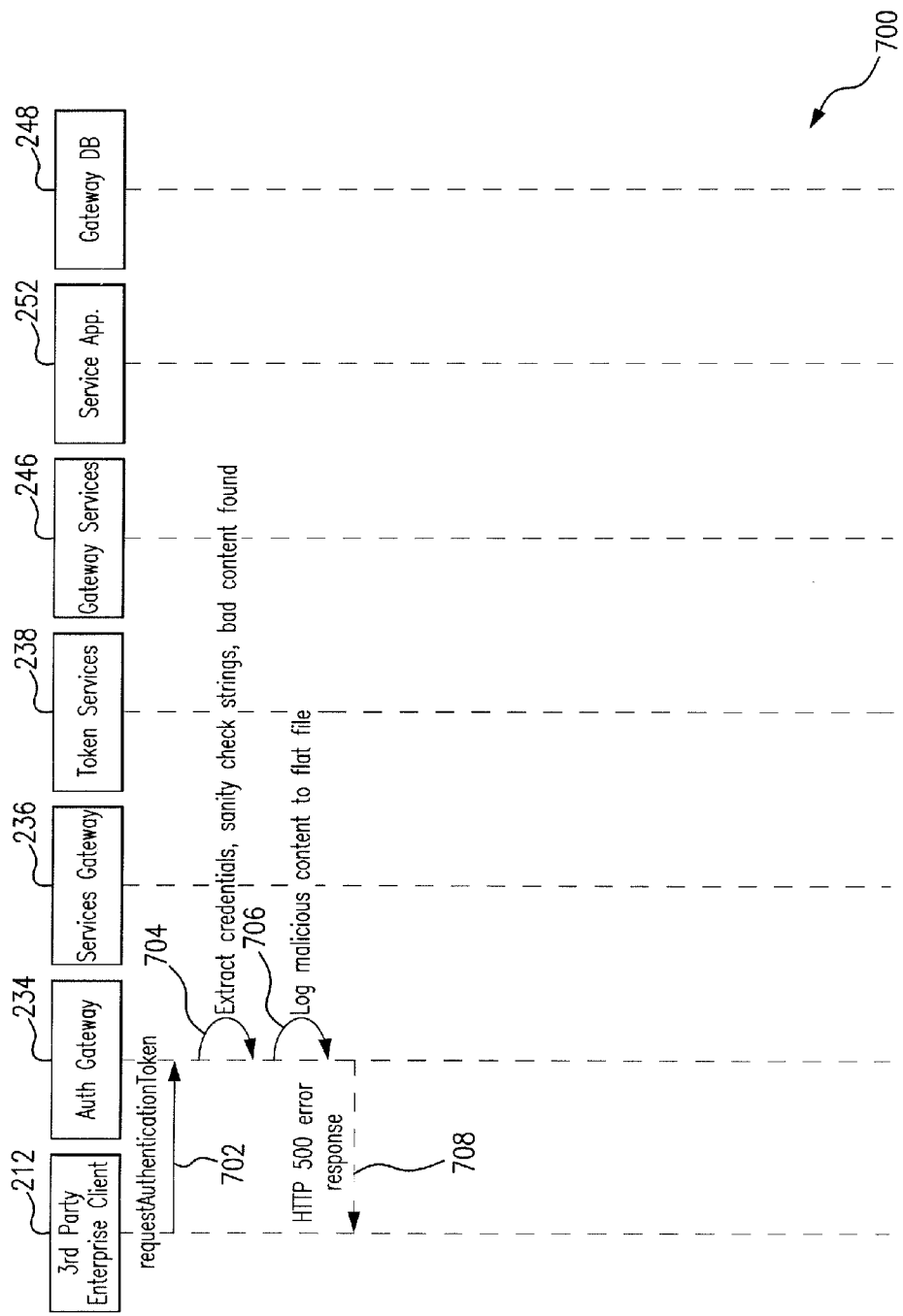

FIG. 7 illustrates a flow diagram of an example of a failed request for an authentication token by TPE client 212 resulting from authentication gateway 234 determining that the credentials submitted by TPE client 212 contained malicious content (e.g., viruses, malware, or other malicious code). Flow 700 begins at step 702 when TPE client 212 communicates a request for an authentication token to authentication gateway 234. At step 704, authentication gateway 234 extracts the credentials of TPE client 212 from the request for an authentication token and determines that the credentials contain malicious content. Authentication gateway 234 may also verify that the authentication request contains necessary information. For example, authentication gateway 234 may verify that a username and password included in the request for authentication are a sufficient length and/or complexity, or that any other necessary information is contained in the request for authentication. At step 706, authentication gateway 234 records that the request from TPE client 212 contained malicious content. At step 708, authentication gateway 234 generates an error response (e.g., HTTP 500 error response) and communicates it to TPE client 212.

Figure 8:
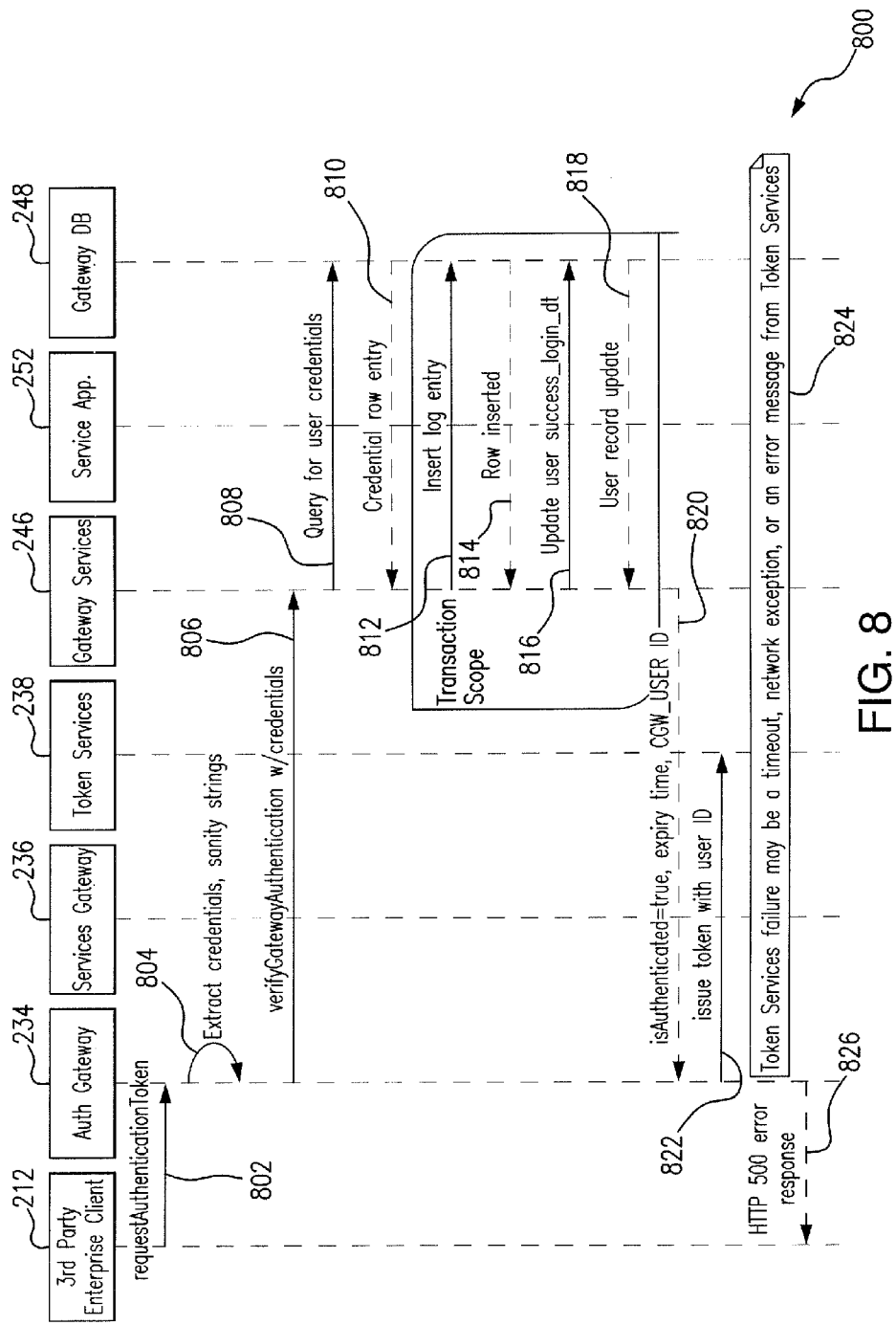

FIG. 8 illustrates a flow diagram of an example of a failed request for an authentication token by TPE client 212 resulting from token service 238 failing (e.g., timeout, network exception, an error message, or other error). Flow 800 begins at step 802 when TPE client 212 communicates a request for an authentication token to authentication gateway 234. At step 804, authentication gateway 234 extracts the credentials of TPE client 212 from the request for an authentication token. Authentication gateway 234 may also verify that the authentication request contains necessary information. For example, authentication gateway 234 may verify that a username and password included in the request for authentication are a sufficient length and/or complexity, that the request for authentication does not contain malicious content, or that any other necessary information is contained in the request for authentication. At step 806, authentication gateway 234 communicates the credentials of TPE client 212 to gateway utility service 246 to authenticate TPE client 212. In certain embodiments, authentication gateway 234 encrypts the username and password (e.g., SSL) before communicating them to gateway utility services 246.

At step 808, gateway utility service 246 queries gateway database 248 for a credentials row for TPE client 212. For example, gateway utility services 246 may take a hash of the username and/or password and query gateway database 248 for a matching hash. In certain embodiments, gateway database 248 does not maintain TPE client 212 credentials in an unencrypted format. At step 810, gateway database 248 searches for a credential row entry for TPE client 212 and returns a credential row entry from gateway database 248 for the credentials of TPE client 212. At step 812, gateway utility service 246 inserts the credentials of TPE client 212 in gateway database 248. At step 814, gateway database 248 confirms that the row entry with the credentials for TPE client 212 was inserted in gateway database 248. At step 816, gateway utility service 246 instructs gateway database 248 to record that TPE client 212 was successfully authenticated. In certain embodiments, if both steps 814 and 818 are not successful, the request for authentication fails.

At step 818, gateway database 248 notifies gateway utility service 246 that the record for TPE client 212 was updated. At step 820, gateway utility service 246 notifies authentication gateway 234 that TPE client 212 is authenticated. In certain embodiments, the notification from gateway utility service 246 includes an expiration time for the authentication token for TPE client 212. At step 822, authentication gateway 234 requests that token service 238 generate an authentication token for TPE client 212. At step 824, token service 238 fails to generate an authentication token (e.g., timeout, network exception, or other token service 238 error). In certain embodiments, upon failing to generate an authentication token, authentication gateway 234 instructs gateway database 248 to record the failure. At step 826, authentication gateway 234 communicates the authentication token for TPE client 212 to TPE client 212.

Figure 9:
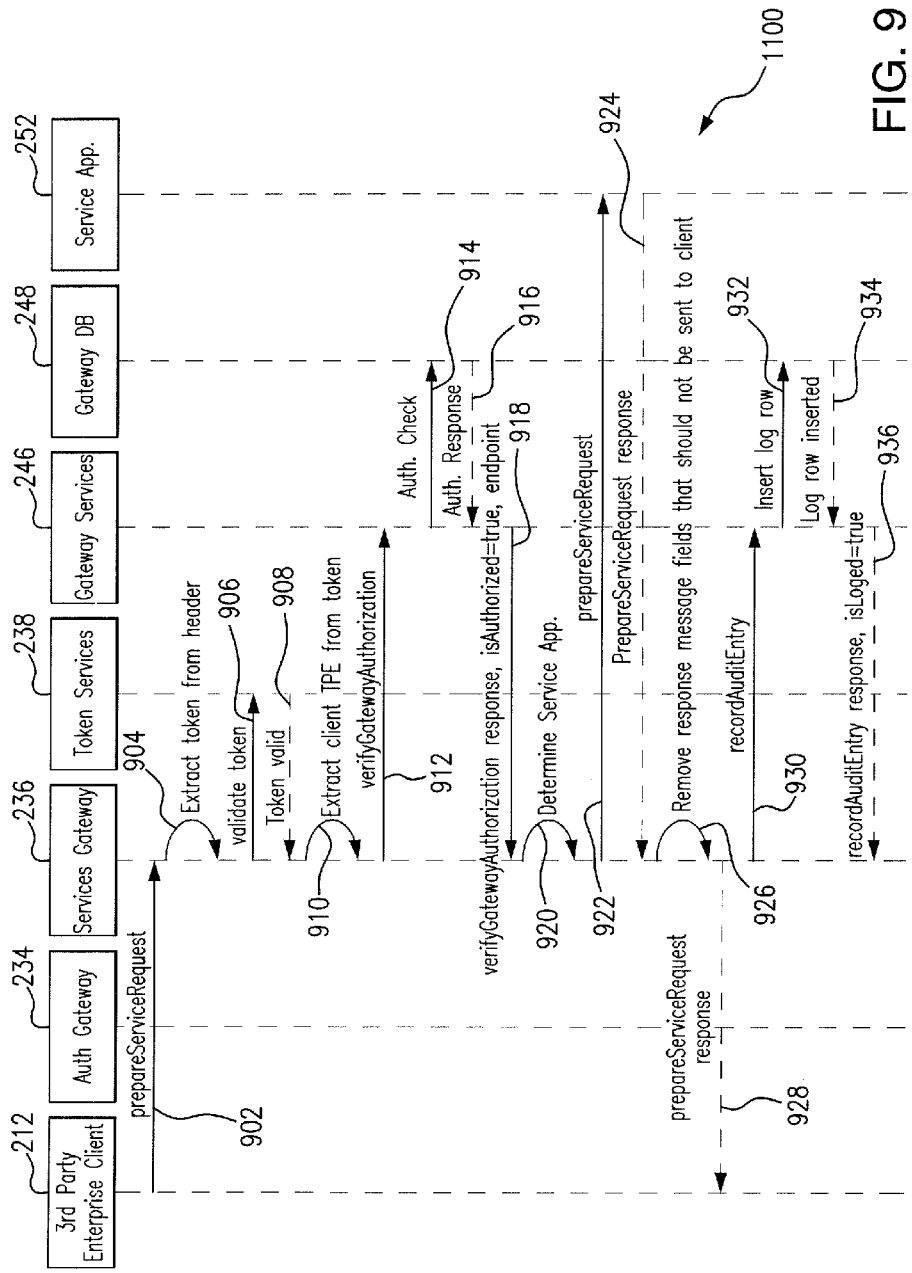

FIG. 9 illustrates a flow diagram of an example of a successful service request from TPE client 212. Flow 900 begins at step 902 when TPE client 212 communicates a service request to services gateway 236. At step 904, services gateway 236 extracts an authentication token from the service request. At step 906, services gateway 236 validates the extracted authentication token with token service 238. At step 908, token service 238 notifies services gateway 236 that the extracted authentication token is valid. At step 910, services gateway 236 extracts the identity of the requesting TPE client 212 from the authentication token.

At step 912, services gateway 236 verifies the authorization of the requesting TPE client 212 from gateway utility service 246. At step 914, gateway utility service 246 queries gateway database 248 to determine whether TPE client 212 is authorized for the service request. At step 916, gateway database 248 sends gateway utility service 246 an authorization response for TPE client 212 notifying gateway utility service 246 that the service request from TPE client 212 is authorized. At step 918, gateway utility service 246 notifies services gateway 236 that TPE client 212 is authorized for the service request. At step 920, services gateway 236 determines the service application 252 responsive to the service request from TPE client 212. At step 922, services gateway 236 communicates the service request to service application 252. At step 924, service application 252 communicates a service response to the service request to services gateway 236 responding to the service request from TPE client 212. At step 926, services gateway 236 removes message fields from the service response from service application 252 that should not be sent to TPE client 212, and communicates the redacted service response to TPE client 212 at step 928.

At step 930, services gateway 236 communicates to gateway utility service 246 to record information related to the service request from TPE client 212 (e.g., the service request, the service response, or other suitable information). At step 932, gateway utility service 246 instructs gateway database 932 to record the information related to the service request from TPE client 212. At step 934, gateway database 248 notifies gateway utility service 246 that the information related to the service request from TPE client 212 has been recorded. At step 936, gateway utility service 246 notifies services gateway that the information related to the service request from TPE client 212 has been recorded in gateway database 248.

Figure 10:
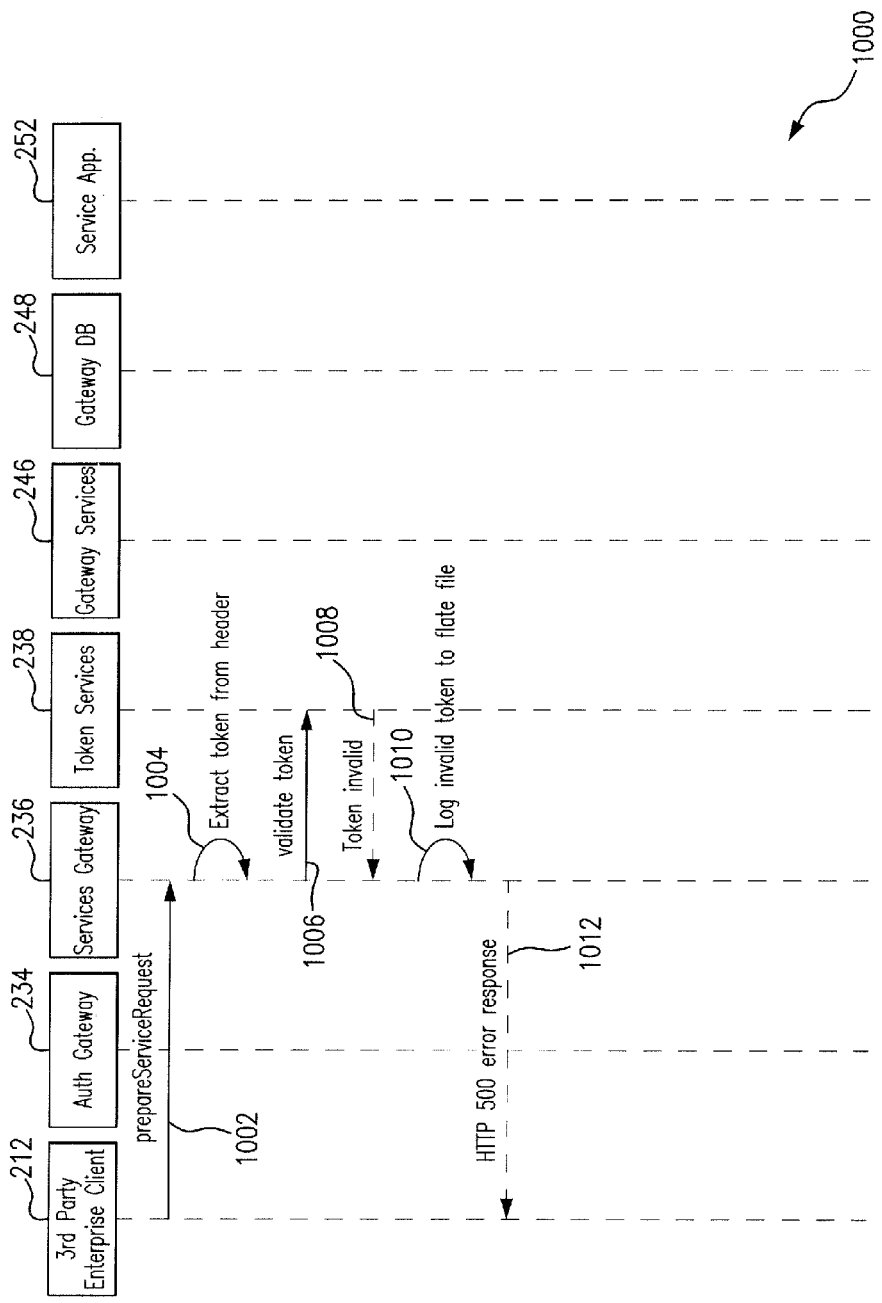

FIG. 10 illustrates a flow diagram of an example of a failed service request from TPE client 212 resulting from token service 238 determining that the authentication token submitted by TPE client 212 is invalid. Flow 1000 begins at step 1002 when TPE client 212 communicates a service request to services gateway 236. At step 1004, services gateway 236 extracts an authentication token from the service request. At step 1006, services gateway 236 validates the extracted authentication token with token service 238. At step 1008, token service 238 notifies services gateway 236 that the extracted authentication token is invalid. At step 1010, services gateway 236 records the invalid authentication token. At step 1012, services gateway 236 generates an error response (e.g., HTTP 500 error response) and communicates it to TPE client 212.

Figure 11:
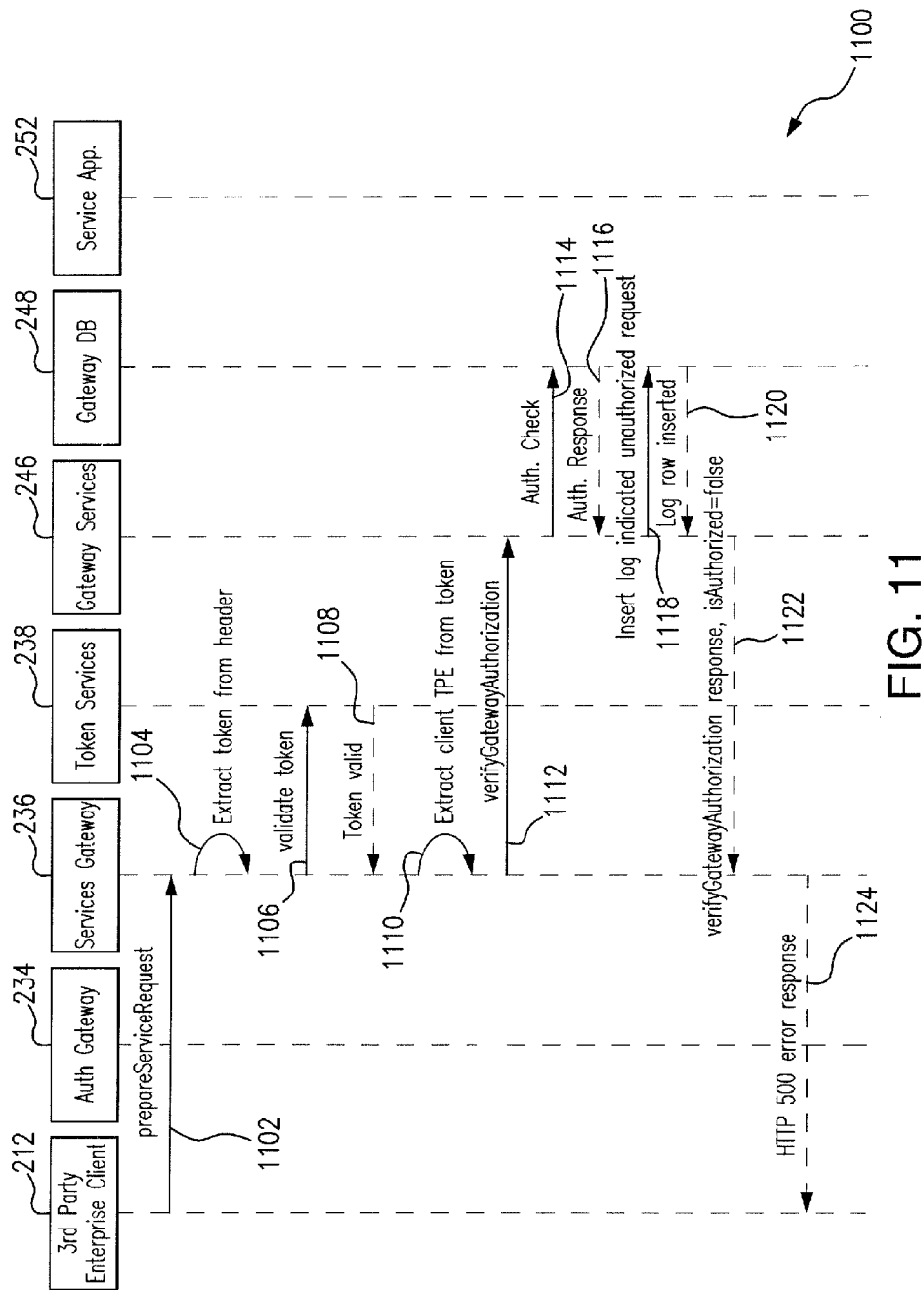

FIG. 11 illustrates a flow diagram of an example of a failed service request from TPE client 212 resulting from gateway utility service 246 determining that TPE client 212 originating the service request is not an authorized TPE client 212. Flow 1100 begins at step 1102 when TPE client 212 communicates a service request to services gateway 236. At step 1104, services gateway 236 extracts an authentication token from the service request. At step 1106, services gateway 236 validates the extracted authentication token with token service 238. At step 1108, token service 238 notifies services gateway 236 that the extracted authentication token is valid. At step 1110, services gateway 236 extracts the identity of the requesting TPE client 212 from the authentication token.

At step 1112, services gateway 236 verifies the authorization of the requesting TPE client 212 from gateway utility service 246. At step 1114, gateway utility service 246 queries gateway database 248 to determine whether TPE client 212 is authorized for the service request. At step 1116, gateway database 248 notifies gateway utility service 246 that TPE client 212 is not authorized for the service request. At step 1118, gateway utility service 246 instructs gateway database 248 to record the unauthorized service request from TPE client 212. At step 1120, gateway database 248 notifies gateway utility service 246 that the unauthorized request has been recorded. At step 1122, gateway utility service 246 notifies services gateway 236 that the service request was unauthorized. At step 1124, services gateway 236 generates an error response (e.g., HTTP 500 error response) and communicates it to TPE client 212.

Figure 12:
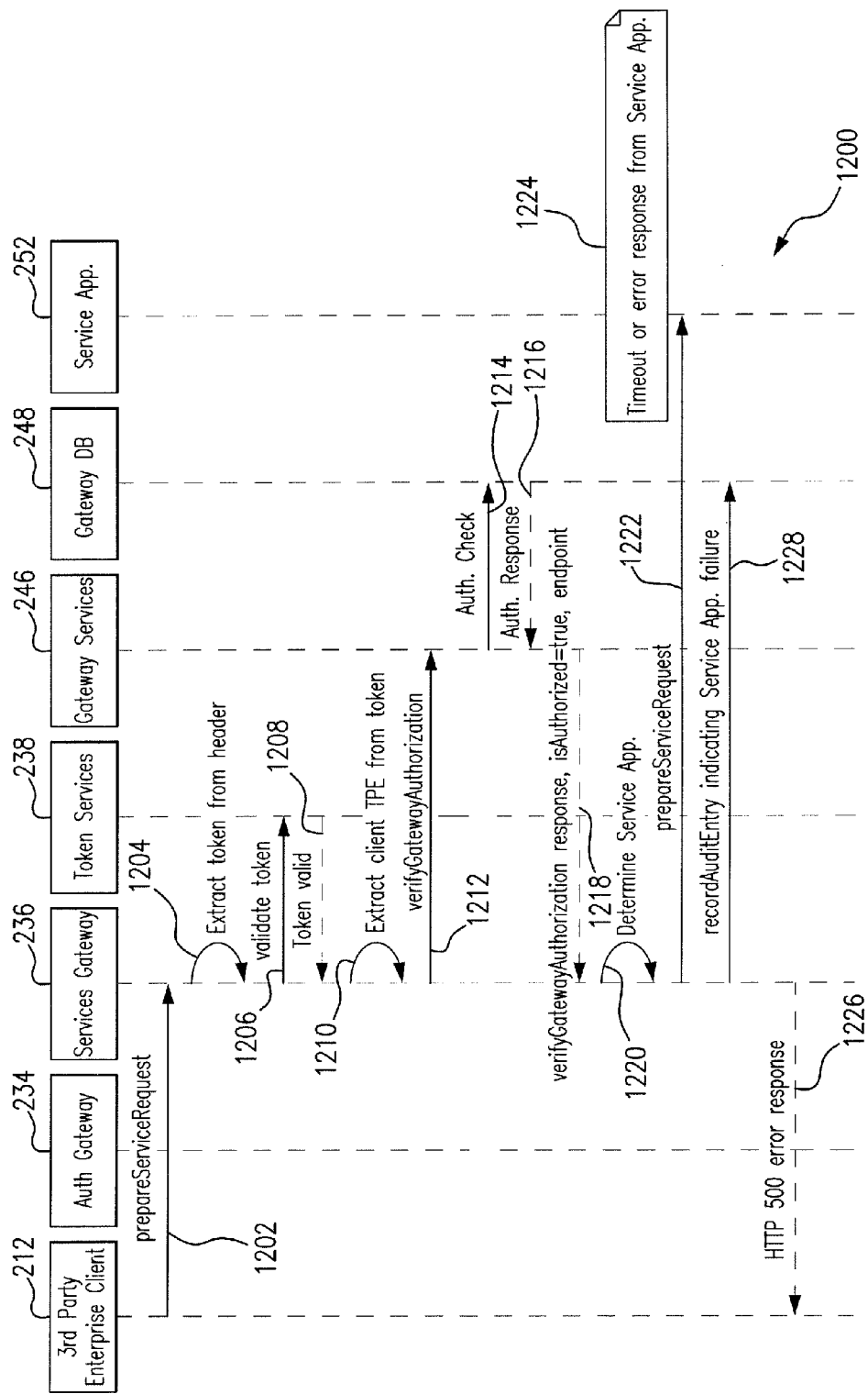

FIG. 12 illustrates a flow diagram of an example of a failed service request from TPE client 212 resulting from an error response from a service application. Flow 1200 begins at step 1202 when TPE client 212 communicates a service request to services gateway 236. At step 1204, services gateway 236 extracts an authentication token from the service request. At step 1206, services gateway 236 validates the extracted authentication token with token service 238. At step 1208, token service 238 notifies services gateway 236 that the extracted authentication token is valid. At step 1210, services gateway 236 extracts the identity of the requesting TPE client 212 from the authentication token.

At step 1212, services gateway 236 verifies the authorization of the requesting TPE client 212 from gateway utility service 246. At step 1214, gateway utility service 246 queries gateway database 248 to determine whether TPE client 212 is authorized for the service request. At step 1216, gateway database 248 notifies gateway utility service 246 that the service request from TPE client 212 is authorized. At step 1218, gateway utility service 246 notifies services gateway 236 that TPE client 212 is authorized for the service request. At step 1220, services gateway 236 determines a service application 252 that is responsive to the service request. At step 1222, services gateway 236 communicates the service request to service application 252.

At step 1224, service application 252 generates an error response indicating a service application 252 error (e.g., a timeout) and communicates it to services gateway 236. At step 1226, services gateway 236 generates an error response (e.g., HTTP 500 error response) and communicates it to TPE client 212. At step 1228, services gateway 236 instructs gateway database 248 to record the service application 252 error.

Modifications, additions, or omissions may be made to flows 400, 500, 600, 700, 800, 900, 1000, and/or 1100. Flows 400, 500, 600, 700, 800, 900, 1000, 1100 and/or 1200 may include more, fewer, or other steps that may be performed by additional components of system 100 or 200. Additionally, steps may be performed in any suitable order, in parallel, and/or sequentially. Any suitable component of may perform one or more steps of flows 400, 500, 600, 700, 800, 900, 1000, 1100 and/or 1200.

Certain embodiments of the present disclosure may provide one or more technical advantages having specific technical effects.

In certain embodiments, an enterprise provides internal computer system services to external third party enterprises, thereby conserving the computational resources consumed by multiple enterprises developing redundant computer systems.

In another embodiment, an enterprise provides internal computer system services to external third party enterprises through a secure gateway, thereby conserving the computational resources expended recovering from attacks from malicious entities.

In yet another embodiment, an enterprise provides internal computer system services to external third party enterprises, thereby conserving the computational resources and bandwidth consumed by multiple enterprises maintaining redundant databases.

In yet another embodiment, an enterprise provides internal computer system services to external third party enterprises by utilizing content based routing to provide the external third party enterprise access to the requested internal service application, thereby conserving the computational resources and bandwidth consumed by intermediate applications passing information between the external third party enterprise and the service application.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for providing internal services to third party enterprises, comprising:
an authentication gateway module comprising memory, an interface, and a processor, the authentication module operable to:
receive a request for authentication from a particular third party enterprise of a plurality of third party enterprises, the request for authentication comprising credentials associated with the particular third party enterprise;
authenticate the particular third party enterprise based on the credentials;
store the credentials associated with the particular third party enterprise at an audit module, the audit module being architecturally distinct from the authentication gateway module such that access to the authentication gateway module does not provide access to the audit module;
generate an authentication token associated with the particular third party enterprise; and
send the authentication token to the particular third party enterprise;
a services gateway module comprising memory, an interface, and a processor, the services gateway module operable to:
receive a service request associated with the particular third party enterprise, the service request including the authentication token associated with the particular third party enterprise;
validate the particular third party enterprise based on a comparison of the authentication token associated with the particular third party enterprise and the credentials associated with the particular third party enterprise stored at the audit module;
determine, based on one or more attributes of the service request, a particular internal service among a plurality of internal services offered by an enterprise that is the subject of the service request;
forward the service request to the particular internal service;
receive results corresponding to the service request generated by the particular internal service;
communicate the results corresponding to the service request to the particular third party enterprise; and
store the results corresponding to the service request.

2. The system of claim 1, wherein the credentials associated with the particular third party enterprise have an expiration date.

3. The system of claim 2, wherein the expiration date is a date that is a predetermined amount of time after the previous authentication of the particular third party enterprise.

4. The system of claim 1, wherein the one or more attributes of the service request are at least one from the set comprising: requesting username, request size, and requested operation.

5. The system of claim 1, wherein the request comprises a request to calculate fees associated with an international fund transfer.

6. The system of claim 1, the one or more processors further operable to query the stored results corresponding to service requests.

7. A non-transitory computer readable storage medium comprising logic for providing internal services to third party enterprises, the logic operable, when executed by a processor, to:
receive, at an authentication gateway module, a request for authentication from a particular third party enterprise of a plurality of third party enterprises, the request for authentication comprising credentials associated with the particular third party enterprise;
authenticate, using the authentication gateway module, the particular third party enterprise based on the credentials;
store the credentials associated with the particular third party enterprise at an audit module, the audit module being architecturally distinct from the authentication gateway module such that access to the authentication gateway module does not provide access to the audit module;
generate, using the authentication gateway module, an authentication token associated with the particular third party enterprise;
send the authentication token to the particular third party enterprise;
receive, at a services gateway module, a service request associated with the particular third party enterprise, the service request including the authentication token associated with the particular third party enterprise;
validate, using the services gateway module, the particular third party enterprise based on a comparison of the authentication token and the credentials associated with the particular third party enterprise stored at the audit module;
determine, using the services gateway module, based on one or more attributes of the service request, a particular internal service among a plurality of internal services offered by an enterprise that is the subject of the service request;
forward the service request to the particular internal service;
receive results corresponding to the service request generated by the particular internal service; and
communicate the results corresponding to the service request to the particular third party enterprise; and
store the results corresponding to the service request.

8. The non-transitory computer readable medium of claim 7, wherein the credentials associated with the particular third party enterprise have an expiration date.

9. The non-transitory computer readable medium of claim 8, wherein the expiration date is a date that is a predetermined amount of time after the previous authentication of the particular third party enterprise.

10. The non-transitory computer readable medium of claim 7, wherein the one or more attributes of the service request are at least one from the set comprising: requesting username, request size, and requested operation.

11. The non-transitory computer readable medium of claim 7, wherein the request comprises a request to calculate fees associated with an international fund transfer.

12. The non-transitory computer readable medium of claim 7, the logic further operable to query the stored results corresponding to service requests.

13. A method for providing internal services to third party enterprises, comprising:
receiving, using an authentication gateway module, a request for authentication from a particular third party enterprise of a plurality of third party enterprises, the request for authentication comprising credentials associated with the particular third party enterprise;

authenticating, using the authentication gateway module, the particular third party enterprise based on the credentials;

storing the credentials associated with the particular third party enterprise at an audit module, the audit module being architecturally distinct from the authentication gateway module such that access to the authentication gateway module does not provide access to the audit module;

generating, using the authentication gateway module, an authentication token associated with the particular third party enterprise;

sending the authentication token to the particular third party enterprise;

receiving, at a services gateway module, a service request associated with the particular third party enterprise, the service request including the authentication token associated with the particular third party enterprise;

validating, using the services gateway module, the particular third party enterprise based on a comparison of the authentication token associated with the particular third party enterprise and the credentials associated with the particular third party enterprise stored at the audit module;

determining, using the services gateway module, based on one or more attributes of the service request, a particular internal service among a plurality of internal services offered by an enterprise that is the subject of the service request;

forwarding the service request to the particular internal service;

receiving results corresponding to the service request generated by the particular internal service; and communicating the results corresponding to the service request to the particular third party enterprise; and storing the results corresponding to the service request.

14. The method of claim 13, wherein the credentials associated with the particular third party enterprise have an expiration date.

15. The method of claim 14, wherein the expiration date is a date that is a predetermined amount of time after the previous authentication of the particular third party enterprise.

16. The method of claim 13, wherein the one or more attributes of the service request are at least one from the set comprising: requesting username, request size, and requested operation.

17. The method of claim 13, further comprising querying the stored results corresponding to service requests.

* * * * *